US008677240B2

(12) United States Patent  (10) Patent No.: US 8,677,240 B2
Sanders et al.  (45) Date of Patent: Mar. 18, 2014

(54) VIDEO PROCESSING SYSTEM PROVIDING ASSOCIATION BETWEEN DISPLAYED VIDEO AND MEDIA CONTENT AND RELATED METHODS

(75) Inventors: Marsha C. Sanders, Melbourne, FL (US); Thomas E. Mikulka, Indialantic, FL (US); Tariq Bakir, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 822 days.

(21) Appl. No.: 12/573,509

(22) Filed: Oct. 5, 2009

(65) Prior Publication Data

US 2011/0083087 A1  Apr. 7, 2011

(51) Int. Cl.
*G06F 3/00* (2006.01)
(52) U.S. Cl.
USPC ............ 715/716; 715/719; 715/721; 715/723
(58) Field of Classification Search
USPC ......................................... 715/203, 716–735
See application file for complete search history.

(56) References Cited

U.S. PATENT DOCUMENTS

| | | | | |
|---|---|---|---|---|
| 5,729,471 | A * | 3/1998 | Jain et al. ...................... | 725/131 |
| 6,006,241 | A * | 12/1999 | Purnaveja et al. ............. | 715/205 |
| 6,144,375 | A * | 11/2000 | Jain et al. ...................... | 715/251 |
| 6,173,317 | B1 * | 1/2001 | Chaddha et al. ............... | 709/219 |
| 6,282,362 | B1 * | 8/2001 | Murphy et al. ................ | 386/224 |
| 6,665,835 | B1 * | 12/2003 | Nicol et al. .................... | 715/202 |
| 6,789,105 | B2 | 9/2004 | Lauwers et al. ............... | 709/204 |
| 6,906,643 | B2 * | 6/2005 | Samadani et al. ....... | 340/995.18 |
| 7,149,961 | B2 * | 12/2006 | Harville et al. ............... | 715/202 |
| 7,454,763 | B2 | 11/2008 | Veselova et al. .............. | 719/329 |
| 7,624,416 | B1 * | 11/2009 | Vandermolen et al. ....... | 725/109 |
| 7,823,066 | B1 * | 10/2010 | Kuramura ...................... | 715/717 |
| 8,151,179 | B1 * | 4/2012 | Raman et al. ................. | 715/203 |
| 2001/0037376 | A1 * | 11/2001 | Ullman et al. ................ | 709/218 |
| 2002/0059342 | A1 * | 5/2002 | Gupta et al. .................. | 707/512 |
| 2004/0098754 | A1 * | 5/2004 | Vella et al. .................... | 725/135 |
| 2004/0155898 | A1 * | 8/2004 | Taguchi et al. ............... | 345/723 |
| 2004/0218895 | A1 * | 11/2004 | Samadani et al. .............. | 386/46 |
| 2005/0257240 | A1 | 11/2005 | Faulkner et al. ................ | 725/92 |
| 2009/0300202 | A1 * | 12/2009 | Hogan et al. .................. | 709/231 |
| 2010/0185933 | A1 * | 7/2010 | Coffman et al. .............. | 715/230 |
| 2010/0228418 | A1 * | 9/2010 | Whitlow et al. ................ | 701/25 |

FOREIGN PATENT DOCUMENTS

| | | | |
|---|---|---|---|
| EP | 1631083 | 3/2006 | ............. H04N 5/91 |
| WO | WO03/019418 | 3/2003 | ............. G06F 17/30 |
| WO | WO2006006875 | 1/2006 | |

* cited by examiner

*Primary Examiner* — Tadeese Hailu
(74) *Attorney, Agent, or Firm* — Allen, Dyer, Doppelt, Milbrath & Gilchrist, P.A.

(57) ABSTRACT

A video processing system may include a display and a video processor coupled to the display. The video processor may be configured to ingest a time-referenced video and media content, correlate the media content to corresponding points in time in the time-referenced video, and generate on the display a video window for playing the time-referenced video and a media window for displaying the media content. The video processor may also be configured to bi-directionally associate the video window and the media window so that playing of the video changes the media window based upon reaching corresponding points in time in the time-referenced video, and so that selection of media content in the media window changes the video play to reflect corresponding points in time in the time-referenced video.

22 Claims, 5 Drawing Sheets

VIDEO PROCESSING SYSTEM PROVIDING ASSOCIATION BETWEEN DISPLAYED VIDEO AND MEDIA CONTENT AND RELATED METHODS

FIELD OF THE INVENTION

The present invention relates to the field of video processing, and, more particularly, to systems and methods for displaying video and related content.

BACKGROUND OF THE INVENTION

The use of video has become increasingly popular in a variety of applications given the continued advancement in video sensor and data storage technologies. For example, video is increasingly relied upon in law enforcement, security, medical, and commercial contexts. With this increased reliance on video has come the need to annotate and index videos to make them more helpful to users, and to more readily exchange important information pertaining to a video between different users.

Various multimedia applications are generally available on the Web that allow media content to be associated with videos. By way of example, Synchronized Multimedia Integration Language (SMIL) is an Extensible Markup Language (XML) based language for describing multimedia presentations. It defines markup for timing, layout, animations, visual transitions, and media embedding, among other things. SMIL allows the representation of media items such as text, images, video, audio, and links to other SMIL presentations, and files from multiple Web servers. SMIL may also be used to create a spatial layout and timeline for entities that are displayed, although there is no interaction between the entities on the screen.

U.S. Pat. No. 7,454,763 discloses an approach to link page content with a media file and display these links during playback of the media file. This approach links notes stored in an electronic document with media, such as video stored in a video file. As media is played back from the media file, visual indicators are displayed adjacent to or over page content so that a user can see how page content relates to the media file. Page content can be highlighted when the page content has a relationship with the media that is being played. That is, page content can be highlighted at different times as the recorded information from a video file is being played back in a video display window.

Tracking of external media content may be particularly important with respect to georeferenced videos, with which there is generally associated geospatial metadata providing position information for pixels within the video. One particularly advantageous system that may be used for processing of geospatial video is the Full-Motion Video Asset Management Engine (FAME™) from the present Assignee Harris Corporation. The FAME™ system speeds the process of analyzing a wide range of intelligence information. For geospatial analysis, the FAME™ system has a mapping interface that provides a visual display for the sensor track and location of frames of video from an unmanned aerial vehicle (UAV) or other source. This tool allows indexing, search, retrieval, and sensor tracking in real time during play out. Further exploitation of geospatial metadata is done by extracting embedded Key-Link-Value (KLV) metadata from the video stream.

Despite the advantages of such approaches, further functionality may be desirable for processing and displaying videos and associated media content in certain applications.

SUMMARY OF THE INVENTION

In view of the foregoing background, it is therefore an object of the present invention to provide a video processing system and related methods with enhanced video and media display functionality.

This and other objects, features, and advantages are provided by a video processing system which may include a display and a video processor coupled to the display. The video processor may be configured to ingest a time-referenced video and media content, correlate the media content to corresponding points in time in the time-referenced video, and generate on the display a video window for playing the time-referenced video and a media window for displaying the media content. Moreover, the video processor may also be configured to bi-directionally associate the video window and the media window so that playing of the video changes the media window based upon reaching corresponding points in time in the time-referenced video, and so that selection of media content in the media window changes the video play to reflect corresponding points in time in the time-referenced video. The system thus provides the ability to dynamically synchronize and relate media content with a video.

By way of example, the media content may comprise time-referenced geospatial coordinates, and the media window may comprise a mapping window for displaying time-referenced geospatial coordinate points within the mapping window. In accordance with another example, the media content may comprise time-referenced user chat entries, and the media window may comprise a chat window for sequentially displaying the time-referenced chat entries. In addition, the media content may comprise time-referenced landmark entries, and the media window may comprise a landmark window for sequentially displaying the time-referenced landmarks. Also by way of example, the media content may comprise time-referenced still images, and the media window may comprise a still image window for displaying the time-referenced still images.

The video processor may also be configured to change the media window by selectively highlighting displayed media content based upon a point in time of the time-referenced video. Furthermore, the video processor may be configured to change the media window by scrolling through displayed media events based upon a point in time of the time-referenced video. By way of example, the time-referenced media content may comprise Extensible Markup Language (XML) formatted media content. In some embodiments, the time-referenced video may comprise a georeferenced video, for example. In addition, the system may further include a user input device coupled to the video processor, and the video processor may be configured to select media content in the media window based upon the user input device.

A related video processor may include at least one ingest module configured to ingest a time-referenced video and media content, and a correlation module configured to correlate the media content to corresponding points in time in the time-referenced video. The video processor may also include a rendering module configured to generate on a display a video window for playing the time-referenced video and a media window for displaying the media content, and bi-directionally associate the video window and the media window so that playing of the video changes the media window based upon reaching corresponding points in time in the time-referenced video, and so that selection of media content in the media window changes the video play to reflect corresponding points in time in the time-referenced video.

A related video processing method may include ingesting a time-referenced video and media content, correlating the media content to corresponding points in time in the time-referenced video, and generating on a display a video window for playing the time-referenced video and a media window for displaying the media content. The method may further include bi-directionally associating the video window and the media window so that playing of the video changes the media window based upon reaching corresponding points in time in the time-referenced video, and so that selection of media content in the media window changes the video play to reflect corresponding points in time in the time-referenced video.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
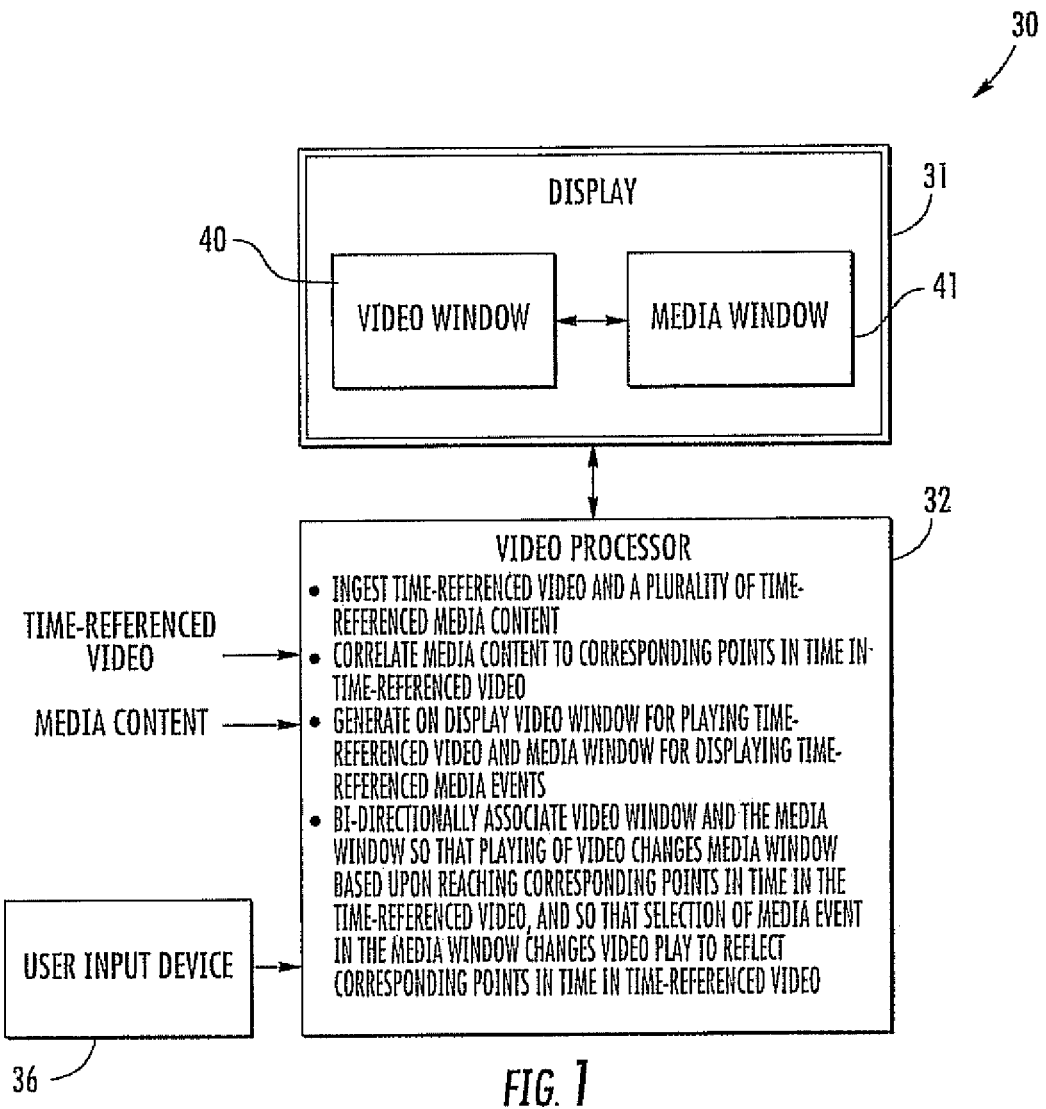
FIG. 1 is a schematic block diagram of a video processing system in accordance with the invention.
Figure 2:
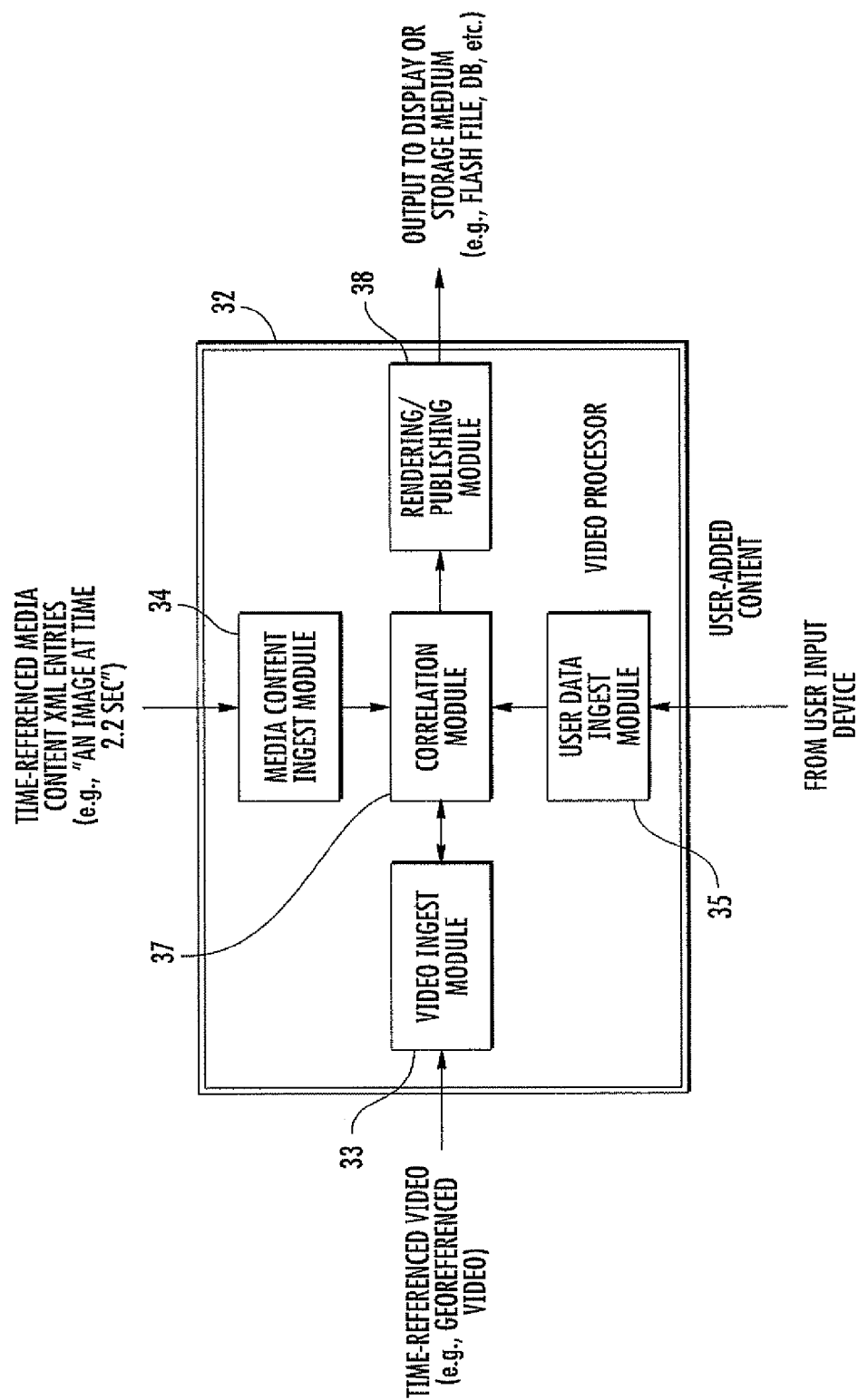
FIG. 2 is a more detailed schematic block diagram of the video processor of FIG. 1.
Figure 3:
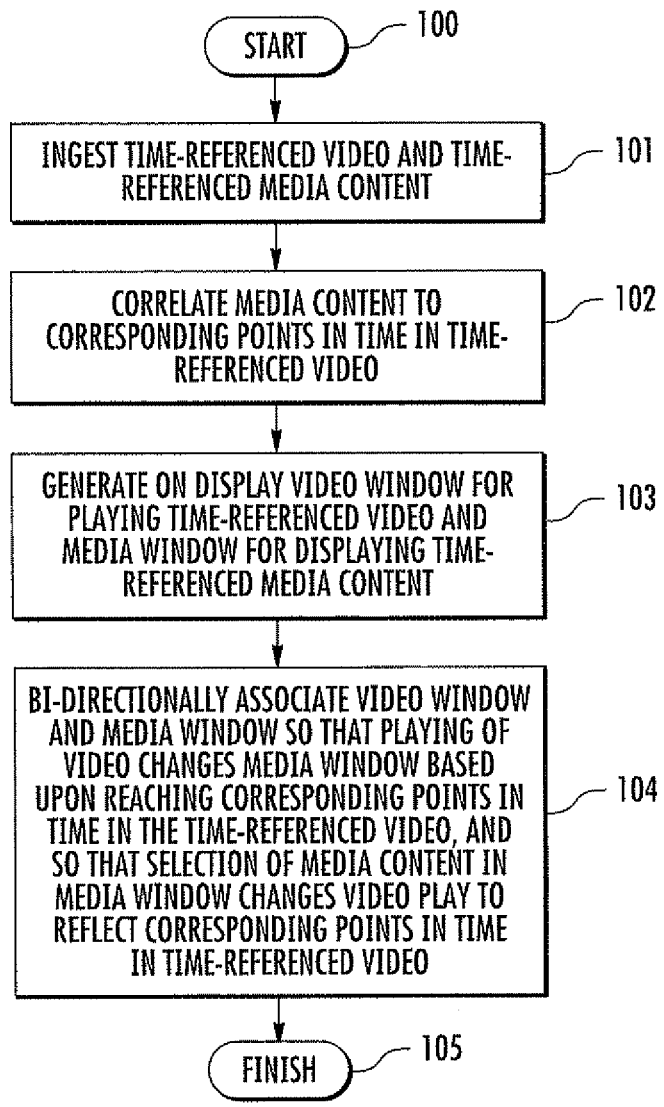
FIG. 3 is a flow diagram illustrating video processing method aspects of the invention.

Referring initially to FIGS. 1-3, a video processing system 30 and related method aspects are first described. Generally speaking, the system 30 advantageously provides for the dynamic creation of an interactive multimedia video presentation in which media content is connected to instances or specific events at time points in a video. By way of example, the video may comprise a video feed, a previously recorded video stored in electronic file format, etc. There are many occasions in which rapid analysis of video and associated data (e.g., imagery, mapping, annotations, etc.) may be useful. As will be discussed further below, the system 30 and methods set forth herein advantageously provide a single or central reference location for analyzing potentially disparate types of data and video, and thereby increasing the amount of useful information that can be conveyed to a user at a given time.

More particularly, the system 30 illustratively includes a display 31 and a video processor 32 coupled to the display. Beginning at Block 100, the video processor 32 is configured to ingest one or more time-referenced videos as well as media content, at Block 101. By way of example, the video may be a georeferenced video in some applications, but non-georeferenced videos may also be used. The media content may include images (e.g., digital still images), chat entries, audio, text annotations such as land marks, points of interest, statistical information, etc., as will be discussed further below. The media content may be time-referenced before it is ingested, or after it has been ingested by the video processor 32.

The video processor 32 is also configured to correlate the media content to corresponding points in time in the time-referenced video, at Block 102. The video processor 32 maybe implemented as a media report tool, which allows an analyst to prepare a multimedia presentation based upon time-referenced video and media content, and the presentation may be stored in a database or in a file in a media viewer format (e.g., Adobe Flash Player, Adobe Acrobat, or GeoPDF). Here, the video processor 32 illustratively includes a respective ingest module 33, 34, 35 for the video, media content, and any user-added data or content. The system 30 may further include a user input device 36 (e.g., a mouse, keyboard, microphone, etc.) for entering the user-added content (text or audio annotations, etc.), as well as for performing other functions such as selecting content on the display 31, as will be discussed further below. The ingest modules 33-35 are each coupled to a correlation module 37, which creates the correlations between the media/user content and the time-referenced video, as will be discussed further below.

The ingest modules 33-35 provide inputs for the respective types of media input thereto. For example, if the media content is in an XML format, then the media ingest module 34 would be configured to receive XML data, although other data formats may be used instead of, or in addition to, XML. Similarly, the video ingest module 33 may be configured to receive video data in FLV, WAV, MPEG, or other suitable video formats, while the user data ingest module 35 may be configured to receive text data in rich text, plain text, and/or HTML formats, for example. One or more of the ingest modules 33-35 may also be configured to receive digital images, such as in JPEG, PNG, or GIF formats, for example.

The video processor 32 further illustratively includes a rendering and/or publishing module for generating on the display 31 a video window 40 for playing the time-referenced video therein, and generating one or more media windows 41 for displaying the media content therein, at Block 103. As noted above, the rendering/publishing module 38 may also be used to correlate the video and user/media content into one or more multimedia files (e.g., Flash, GeoPDF, etc.) that may be displayed at a later time. In this regard, the rendering and publishing functions of the video processor 32 may be implemented on separate computers or devices. For example, the ingest and correlation operations may be performed at a first computer station by an analyst to publish the multimedia file(s), while generation of the video and media windows 40, 41 may be performed at a different computer station by a rendering module or application (e.g., a multimedia viewer) installed thereon which processes the multimedia file(s), as will be appreciated by those skilled in the art.

Figure 5:
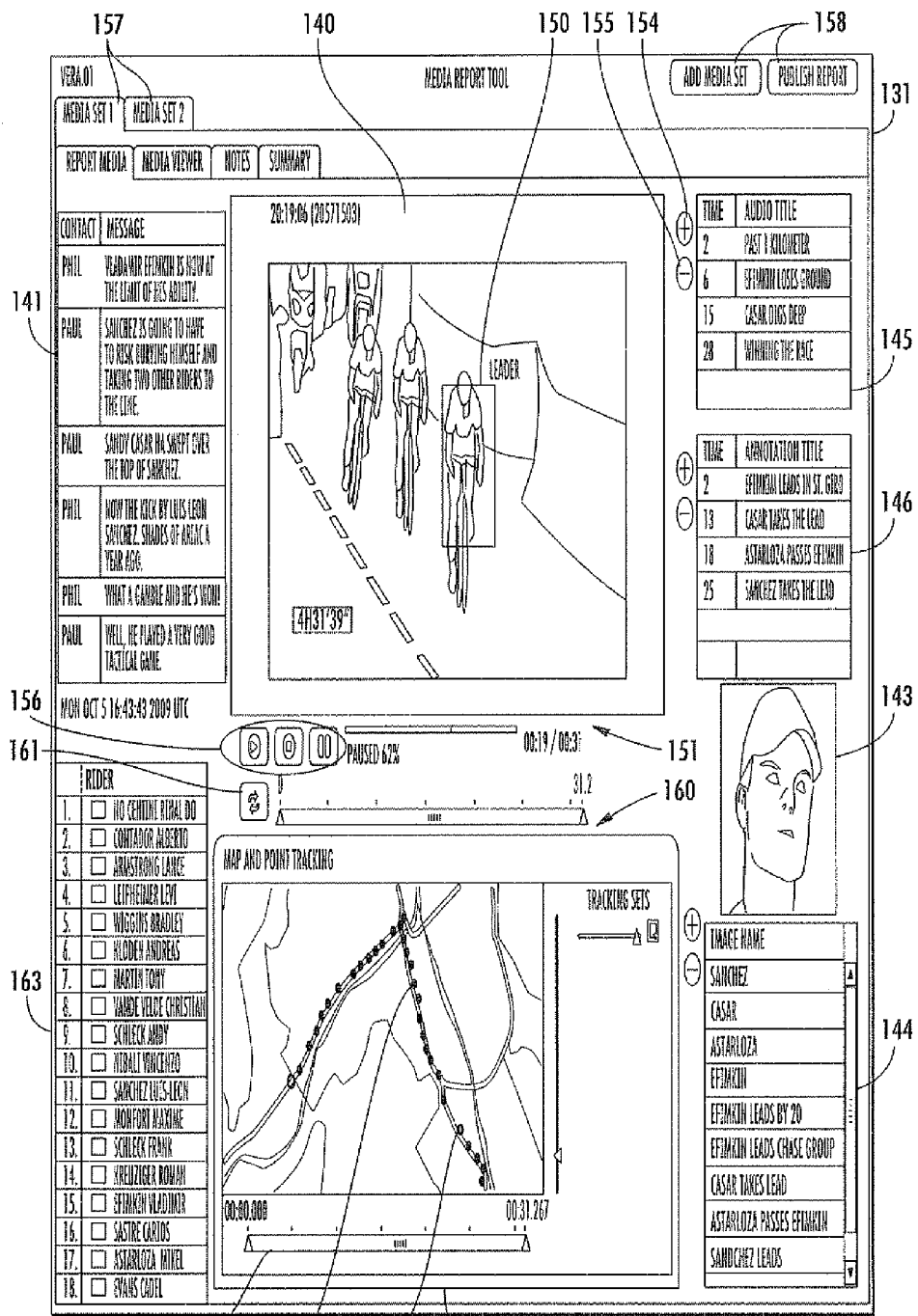
FIG. 5 is a display view illustrating bi-directionally related video and media content windows which may be generated by the video processing system of FIG. 1.

More particularly, the video processor 32 is also advantageously configured to bi-directionally associate the video window 40 and the media window(s) 41 so that playing of the time-referenced video changes the media window based upon reaching corresponding points in time in the time-referenced video, and so that selection of media content in the media window changes the video play to reflect corresponding points in time in the time-referenced video, at Block 104, thus concluding the method illustrated in FIG. 5 (Block 105). By way of example, the bi-directional association may be created by the correlation module 37 and incorporated as machine-readable correlation instructions in the multimedia files to be implemented by the rendering/publishing module 38 when processed for viewing.

Figure 4:
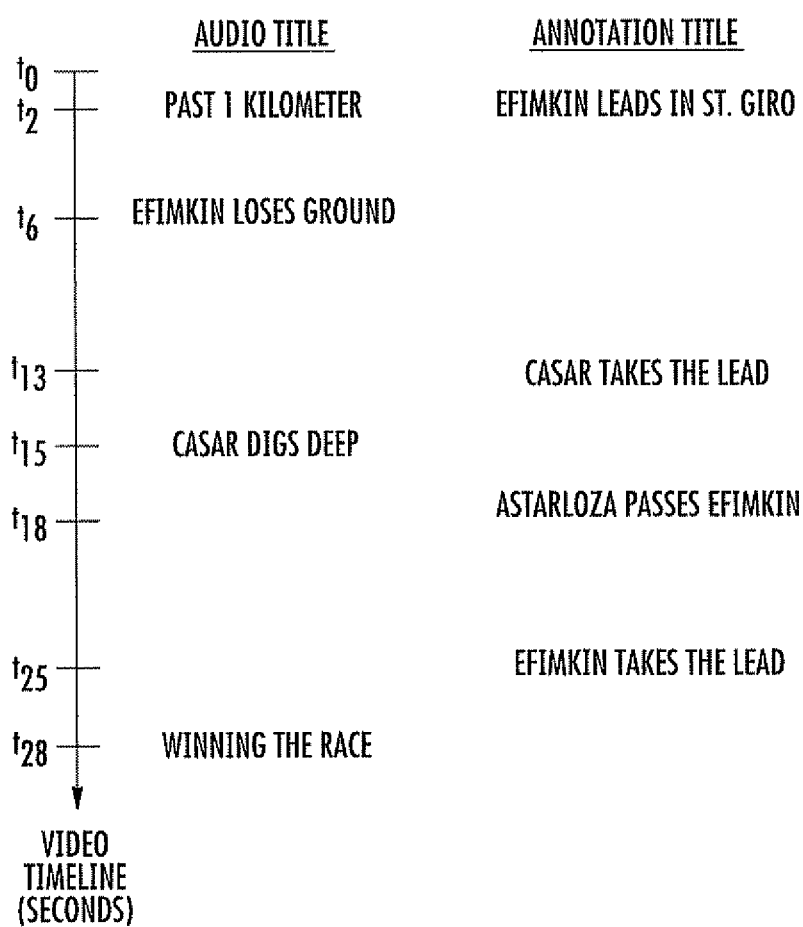
FIG. 4 is a timeline diagram illustrating the correlation of media content events to points in a video timeline which may be generated by the video processing system of FIG. 1.

An exemplary implementation of a media report tool and correlation operations used to generate the dynamically and bi-directionally synchronized multimedia presentation are now described further with reference to FIGS. 4 and 5. By way of example, the media report tool may be an interactive Adobe Flash-based application built using Adobe Flex and Java, although other suitable programming languages and platforms may also be used, as will be appreciated by those skilled in the art. In the illustrated example, the display 131 illustratively includes a video window 140, a message or chat window 141, a mapping window 142, an image window 143 and associated image name window 144, an audio tag window 145, an annotation window 146, and a legend window 163 for displaying respective media content. As used herein, the term "window" is merely intended to indicate a region within the display in which the various video or content is displayed, and not that they are required to have a particular form factor such as visible boundary lines, window or menu bars, scroll bars, etc., although such items may be included if desired. Moreover, such windows may take various geometric shapes beside squares or rectangles, if desired.

The correlation of the various audio and text annotations respectively displayed in the windows 145 and 146 (FIG. 5) to points in time in the time-referenced video is illustrated in FIG. 4. In the present example, the video displayed in the video window 140 is video of a bicycle race in which the leader is indicated with a rectangular box 150. The correlation module 37 receives four audio clips via the media data ingest module 34 and/or the user data ingest module 35, and the audio clips are time-referenced to specific locations or points in the video timeline. The audio clips (or other media content) may be automatically time-referenced upon entry thereof by a user when watching the video. For example, an analyst watching a real-time surveillance video may make audio, graphical, and/or text annotations, which are time-stamped based upon the clock or timer associated with the video, as will be appreciated by those skilled in the art. For example, the above-noted FAME™ system may provide such time-referenced media content. The media content may also be manually time-referenced, such as by adding time references to XML content lists, etc. Other suitable approaches for time-referencing the media/user content may also be used, as will be appreciated by those skilled in the art. Moreover, time referencing of the media content may also occur after ingest, as noted above.

In the present example, the audio clip "Past 1 kilometer" corresponds to a point 2 seconds into the video playback, "Efimkin loses ground" corresponds to the 6 second point, "Casar digs deep" corresponds to the 15 second point, and "Winning the race" corresponds to the 28 second point. The correlation module 37 thus correlates the respective sound clips to these points in the video timeline by automatically generating respective video data points (i.e., trigger points) for each content entry. With respect to the annotations, the correlation module 37 also receives four text annotations entitled "Efimkin leads in St. Giro" which corresponds to the 2 second point, "Casar takes the lead" which corresponds to the 13 second point, "Astarloza passes Efimkin" which corresponds to the 18 second point, and "Sanchez takes the lead" which corresponds to the 25 second point. Other annotations may also be used, such as graphics (e.g., icons, shapes, etc.), colors, etc.

Accordingly, when the video is played back, the video processor 32 advantageously monitors playback progress to detect when the various media or user content points are reached along the video timeline. When one of these dynamically created points is reached in the video playback timeline, the video processor 32 triggers an appropriate operation on the respective media window, such as sequentially displaying (in the case of multiple items) audio titles in the window 145 and annotation titles in the window 146. Another operation may include scrolling the titles, etc., in the media window so that only the current, most recent, and/or near future titles are displayed in accordance with the video timeline. Still another operation may include highlighting the current or latest annotation title or item in a media window. In the illustrated example, the video playback is at the nineteen second point ($t_{19}$) as seen from a video time bar 151, which is just past the text annotation point for "Astarloza passes Efimkin" at time $t_{18}$, and thus this annotation is highlighted as shown. In this way, playing of the time-referenced video in the window 140 changes the windows 145, 146 based upon reaching corresponding points in time in the time-referenced video timeline (i.e., by listing new entries or titles, scrolling, highlighting, etc.).

Yet, the windows 145, 146 are also bi-directionally associated with the video window 40 so that selection of the media content from these media windows also changes the video play to reflect corresponding points in time in the time-referenced video. Thus, for example, if a user were to select the audio title "Efimkin loses ground" from the window 145, the video playback would return (i.e., "rewind") to time $t_6$ and resume the video playback at this point, along with playing the associated audio file entitled "Efimkin loses ground". Selection may occur by clicking/double-clicking on a content entry, spoken instructions (e.g., via a microphone), keystroke commands, etc., as will be appreciated by those skilled in the art.

Selection of the media content may also affect video playback in other ways. For example, there may be multiple time-referenced videos input to the video processor 32 (e.g., multiple surveillance cameras monitoring a same event, multiple cameras filming a sporting event from different angles, etc.). As such, selecting a particular media content item may cause the video window 140 to switch to a different video with which the media content item is associated. For example, certain items (e.g., landmarks, people, etc.) may only be visible in one of the videos, and thus selection of a reference to a given item would cause the video window 140 to display the respective video in which the given item is visible. It should also be noted that in such embodiments multiple video windows 140 may be used (i.e., a respective video window may be displayed for each video) that may change as appropriate based upon selection of content in a media window, as described above.

With respect to the message/chat window 141, image window 143, image name window 144, and legend window 163, their respective operation may be as similarly described above for the windows 145 and 146 (e.g., content entries or images may be added/removed from a sequential list thereof, scrolled within the list, highlighted, etc.). In the illustrated example, the legend window 163 displays a legend of riders' names, position in the race, and flag icons representing the riders' respective countries of origin. Other appropriate legends may be used for other types of videos.

Further unique changes may be made to the mapping window 142. In the illustrated example, geospatial coordinates for the lead rider are provided to the correlation module 37 via the media data ingest module 34. As such, the correlation module 37 may advantageously correlate the geospatial coordinates to respective time points on the video timeline, which allows the video processor 32 to generate a track including tracking points 152 on a map in the mapping window 142 as the corresponding points in the video timeline are reached.

The video processor 32 also generates various user control features on the display 131, such as add and drop buttons 154, 155 which allow users to add user media content, as noted above, or delete selected media content entries. Moreover, video playback play/stop/pause buttons 156 allow video playback to be started, stopped, paused, etc. In addition, tabs 157 are provided for switching between different media sets or views, and buttons 158 are also provided for adding media sets, publishing reports, etc., as will be appreciated by those skilled in the art. Further, a video slider bar 160 allows users to change the video playback position or time and select a portion of a video to play by sliding the triangles to mark start and end points. In such case, only media content that falls within the selected portion of the video will be acted upon or presented in the various windows. For example, if the slider bar starts the video at 10 seconds and an audio entry is at 6 seconds, the audio entry is never heard (i.e., it is not played). The reset button 161 to the left of the slider 160 resets the slider. A similar slider bar 162 may also be provided for the mapping window 142, which may optionally be bi-directionally associated with the video window 140 in some embodiments, but need not be in all embodiments. Other user controls may also be provided in different embodiments or configurations, as will be appreciated by those skilled in the art.

The video processing system 30 therefore dynamically relates video with other media content to form a bi-directional association or interdependence therebetween, and provides for the automatic generation of multimedia presentations for a video-centric environment. In particular, the system 30 advantageously also provide for the association of geospatial map points with video playback, as noted above.

The systems 30 may advantageously be used for numerous applications, such as defense applications and municipal services (e.g., police, fire, etc.). Another exemplary application is in medical/health fields, such as associating video MRI data with patient information, or providing visual indicators for the hearing impaired, etc. Various commercial applications are also possible. One such example is for travel, such as providing tourist videos with additional associated tourist information. Still another possibility is sporting events, in which player statistics, plays in a game, racing positions, etc., may be correlated to specific points in the video timeline for the event. Yet another possibility is for sales management, such as providing maps of customer sites and customer information along with product/sales or facility tour videos, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A video processing system comprising:
a display; and
a video processor coupled to said display and configured to
ingest a plurality of different time-referenced videos and a plurality of different media content entries,
correlate the plurality of different media content entries to corresponding points in time in respective time-referenced videos,
generate on said display a video window for playing at least one of the time-referenced videos and a media window for simultaneously displaying at least some of the plurality of different media content entries, and
bi-directionally associate the video window and the media window so that playing of the video changes the media window based upon reaching corresponding points in time in the time-referenced video, and so that selection of a given media content entry from among the plurality of different media content entries in the media window changes the video play to reflect a corresponding point in time in the time-referenced video and to switch to at least one other video with which the selected media content item is associated.

2. The video processing system of claim 1 wherein the different media content entries comprise different time-referenced geospatial coordinates; and wherein the media window comprises a mapping window for displaying time-referenced geospatial coordinate points within the mapping window.

3. The video processing system of claim 1 wherein the different media content entries comprise different time-referenced user chat entries; and wherein the media window comprises a chat window for sequentially displaying the time-referenced chat entries.

4. The video processing system of claim 1 wherein the different media content entries comprise different time-referenced landmark entries; and wherein the media window comprises a landmark window for sequentially displaying the time-referenced landmarks.

5. The video processing system of claim 1 wherein the different media content entries comprise different time-referenced still images; and wherein the media window comprises a still image window for displaying the time-referenced still images.

6. The video processing system of claim 1 wherein said video processor is configured to change the media window by selectively highlighting displayed media content entries based upon a point in time of the at least one time-referenced video.

7. The video processing system of claim 1 wherein said video processor is configured to change the media window by scrolling through displayed media content event entries based upon a point in time of the at least one time-referenced video.

8. The video processing system of claim 1 wherein the media content entries comprise Extensible Markup Language (XML) formatted media content entries.

9. The video processing system claim 1 wherein the time-referenced videos comprise georeferenced videos.

10. The video processing system of claim 1 further comprising a user input device coupled to said video processor; and wherein said video processor is configured to select media content entries in the media window based upon said user input device.

11. A video processing system comprising:
a display;
user input device; and
a video processor coupled to said display and said user input device and configured to
ingest a plurality of different time-referenced georeferenced videos and a plurality of different media content entries,
correlate the media content entries to corresponding points in time in respective time-referenced georeferenced videos,
generate on said display a video window for playing at least one of the time-referenced georeferenced videos and a media window for displaying at least some of the plurality of different media content entries, and
bi-directionally associate the video window and the media window so that playing of the time-referenced georeferenced video changes the media window based upon reaching corresponding points in time in the time-referenced georeferenced video, and so that selection of a given media content entry from among the plurality of different media content entries in the media window via said user input device changes the video play to reflect a corresponding point in time in the time-referenced georeferenced video and to switch to at least one other video with which the selected media content item is associated.

12. The video processing system of claim 11 wherein the different media content entries comprise different time-referenced geospatial coordinates; and wherein the media window comprises a mapping window for displaying time-referenced geospatial coordinate points within the mapping window.

13. The video processing system of claim 11 wherein the different media content entries comprise different time-referenced user chat entries; and wherein the media window comprises a chat window for sequentially displaying the time-referenced chat entries.

14. The video processing system of claim 11 wherein the different media content entries comprise different time-referenced landmark entries; and wherein the media window comprises a landmark window for sequentially displaying the time-referenced landmarks.

15. A video processor comprising:
a memory and a processor coupled to said memory and configured to
ingest a of different time-referenced videos and a plurality of different media content entries;
correlate the plurality of different media content entries to corresponding points in time in respective time-referenced videos;
generate on a display a video window for playing at least one of the time-referenced videos and a media window for displaying at least some of the plurality of different media content, entries; and
bi-directionally associate the video window and the media window so that playing of the video changes the media window based upon reaching corresponding points in time in the time-referenced video, and so that selection of a given media content entry from among the plurality of different media content entries in the media window changes the video play to reflect a corresponding point in time in the time-referenced video and to switch to at least one other video with which the selected media content item is associated.

16. The video processor of claim 15 wherein the different media content entries comprise different time-referenced geospatial coordinates; and wherein the media window comprises a mapping window for displaying time-referenced geospatial coordinate points within the mapping window.

17. The video processor of claim 15 wherein the different media content entries comprise different time-referenced user chat entries; and wherein the media window comprises a chat window for sequentially displaying the time-referenced chat entries.

18. The video processor of claim 15 wherein the different media content entries comprise different time-referenced landmark entries; and wherein the media window comprises a landmark window for sequentially displaying the time-referenced landmarks.

19. A video processing method comprising:
ingesting a plurality of different time-referenced videos and a plurality of different media content entries;
correlating the plurality of different media content entries to corresponding points in time in respective time-referenced videos;
generating on a display a video window for playing at least one of the time-referenced videos and a media window for simultaneously displaying at least some of the plurality of different media content entries; and
bi-directionally associating the video window and the media window so that playing of the video changes the media window based upon reaching corresponding points in time in the time-referenced video, and so that selection of a given media content entry from among the plurality of different media content entries in the media window changes the video play to reflect a corresponding point in time in the time-referenced video and to switch to at least one other video with which the selected media content item is associated.

20. The method of claim 19 wherein the different media content entries comprise different time-referenced geospatial coordinates; and wherein the media window comprises a mapping window for displaying time-referenced geospatial coordinate points within the mapping window.

21. The method of claim 19 wherein the different media content entries comprise different time-referenced user chat entries; and wherein the media window comprises a chat window for sequentially displaying the time-referenced chat entries.

22. The method of claim 19 wherein the different media content entries comprise different time-referenced landmark entries; and wherein the media window comprises a landmark window for sequentially displaying the time-referenced landmarks.

* * * * *